(12) United States Patent
Anttila et al.

(10) Patent No.: US 12,330,407 B2
(45) Date of Patent: Jun. 17, 2025

(54) LINERLESS NON-TOP COATED THERMAL PRINTABLE MATERIAL, METHOD FOR PRODUCING THE SAME AND THERMAL LABEL

(71) Applicant: Jujo Thermal Oy, Kauttua (FI)

(72) Inventors: Mika Anttila, Masku (FI); Elina Mattila, Köyliö (FI); Arja Pylväs, Eura (FI)

(73) Assignee: Jujo Thermal Oy, Kauttua (FI)

( * ) Notice: Subject to any disclaimer, the term of this patent is extended or adjusted under 35 U.S.C. 154(b) by 12 days.

(21) Appl. No.: 18/355,440

(22) Filed: Jul. 20, 2023

(65) Prior Publication Data

US 2024/0034046 A1    Feb. 1, 2024

(30) Foreign Application Priority Data

Jul. 27, 2022   (EP) .................................... 22187220

(51) Int. Cl.
*B32B 37/00*    (2006.01)
*B32B 21/02*    (2006.01)
(Continued)

(52) U.S. Cl.
CPC ............ *B32B 37/156* (2013.01); *B32B 21/02* (2013.01); *B32B 21/04* (2013.01);
(Continued)

(58) Field of Classification Search
CPC ....... B32B 21/02; B32B 21/04; B32B 37/156; B32B 37/2037; B32B 2307/243;
(Continued)

(56) References Cited

U.S. PATENT DOCUMENTS 5,977,021 A * 11/1999 Aoyama ................ B41M 5/426
503/216
2014/0234558 A1    8/2014 Ikeda et al.

FOREIGN PATENT DOCUMENTS

EP            1967379 A1    9/2008
JP       2001081425 A  *  3/2001
(Continued)

OTHER PUBLICATIONS

Machine Translation of JP-2010214929-A (Year: 2010).*
(Continued)

*Primary Examiner* — Mark Ruthkosky
*Assistant Examiner* — Sathavaram I Reddy
(74) *Attorney, Agent, or Firm* — Ziegler IP Law Group, LLC.

(57) ABSTRACT

A method for producing linerless non-top coated thermal printable material. The method includes preparing thermal printable material by receiving base printable material, wherein base printable material being 75% w/w to 85% w/w of linerless non-top coated thermal printable material; applying heat-resistant material on base printable material, wherein heat-resistant material being 12% w/w to 18% w/w of linerless non-top coated thermal printable material; applying heat-sensitive material on heat-resistant material to produce thermal printable material, wherein heat-sensitive material being 3% w/w to 7% w/w of linerless non-top coated thermal printable material; and subjecting thermal printable material to supercalendering operation, supercalendering operation comprising passing thermal printable material through at least two calender rolls at temperature ranging from 30° C. to 80° C. rolling at speed ranging from 150 m/min to 500 m/min at pressure ranging from 50 bar to 120 bar to obtain linerless non-top coated thermal printable material.

7 Claims, 4 Drawing Sheets

(51) Int. Cl.
  *B32B 21/04* (2006.01)
  *B32B 37/24* (2006.01)
(52) U.S. Cl.
  CPC ... *B32B 2037/243* (2013.01); *B32B 2307/306* (2013.01); *B32B 2307/538* (2013.01); *B32B 2307/718* (2013.01); *B32B 2307/726* (2013.01); *B32B 2307/7376* (2023.05); *B32B 2307/75* (2013.01); *B32B 2309/02* (2013.01); *B32B 2309/12* (2013.01); *B32B 2309/14* (2013.01); *B32B 2519/00* (2013.01)
(58) Field of Classification Search
  CPC ........ B32B 2307/306; B32B 2307/538; B32B 2307/718; B32B 2307/726; B32B 2307/7376; B32B 2307/75; B32B 2309/02; B32B 2309/12; B32B 2309/14; B32B 2519/00
  See application file for complete search history.

(56) References Cited

FOREIGN PATENT DOCUMENTS

| | | | |
|---|---|---|---|
| JP | 2010214929 A | * | 9/2010 |
| JP | 2014032241 A | * | 2/2014 |
| KR | 20150114516 A | * | 10/2015 |
| WO | 2022069458 A1 | | 4/2022 |

OTHER PUBLICATIONS

Machine Translation of JP-2014032241-A (Year: 2014).*
Machine Translation of KR-20150114516-A (Year: 2015).*
Machine Translation of JP-2001081425-A (Year: 2001).*
European Patent Office, Extended European Search Report, Application No. 22187220.3, Mailed Jan. 30, 2023, 8 pages.

* cited by examiner

LINERLESS NON-TOP COATED THERMAL PRINTABLE MATERIAL, METHOD FOR PRODUCING THE SAME AND THERMAL LABEL

TECHNICAL FIELD

The present disclosure relates to a method for producing a linerless non-top coated thermal printable material. The present disclosure also relates to a linerless non-top coated thermal printable material. The present disclosure also relates to a thermal label comprising the linerless non-top coated thermal printable material.

BACKGROUND

The consumption of thermal printable material, such as paper, laminates, and the like, is growing globally due to various applications thereof and is also expected to rise for the foreseeable future. Notably, the retail industry is the largest end-user of the thermal printable material. In this regard, the retail industry has increased the use of point of sale (POS) terminals as an alternative to cash registers in various sectors of the economy, such as in the coffee shops, restaurants, hospitality, craftsman shops, and so forth. Additionally, an increase in online purchases of products has led to a huge demand for the thermal printable material for labeling thereof. Traditionally, a thermal label is used in a wide range of applications including, but not limited to, packaging of items, transportation services, logistic and retail price-weight applications, tickets, receipts, the food industry. Typically, the thermal label is composed of several layers of materials including a thermal printable material, such as a paper, adhesive, silicone, and any other suitable material.

Conventional thermal labels comprises a liner attached to the aforementioned components of the thermal labels. Moreover, the conventional thermal labels require the liner to be removed therefrom, prior to its use, for example, during packaging when the label is being affixed to an object. However, the conventional thermal labels are not economical as they require an extra layer of the liner to be produced and affixed thereto. Moreover, the liner generates an additional amount of waste, thereby increasing disposing costs thereof. Furthermore, the said thermal label requires a large storage space due to the extra layer of the liner associated therewith. For example, the liner on a thermal label roll may occupy an additional 30-40% of space thereon.

Additionally, conventional thermal labels possess a poor quality such as a high coarseness, thereby requiring a large amount of silicone to be applied thereon in order to achieve a suitably good release. However, as the silicone is expensive, the increased use of silicone may increase the production cost of the said thermal label. Moreover, the large amount of silicone is more difficult to cure. Furthermore, the conventional thermal labels may not withstand high pressure during production thereof and may deteriorate the quality of the thermal print, when applied thereon. Additionally, the conventional thermal labels lack improved quality such as high image density, moisture, heat, UV, and plasticizer resistance.

Therefore, in light of the foregoing discussion, there exists a need to overcome the aforementioned drawbacks associated with the existing thermal labels.

SUMMARY

The present disclosure seeks to provide a method for producing a linerless non-top coated thermal printable material. The present disclosure also seeks to provide a linerless non-top coated thermal printable material. The present disclosure also seeks to provide a thermal label comprising the linerless non-top coated thermal printable material. An aim of the present disclosure is to provide a solution that overcomes at least partially the problems encountered in prior art.

In one aspect, an embodiment of the present disclosure provides a method for producing a linerless non-top coated thermal printable material, the method comprising:
  preparing a thermal printable material by:
    receiving a base printable material, wherein the base printable material being 75% w/w to 85% w/w of the linerless non-top coated thermal printable material;
    applying a heat-resistant material on the base printable material, wherein the heat-resistant material being 12% w/w to 18% w/w of the linerless non-top coated thermal printable material; and
    applying a heat-sensitive material on the heat-resistant material to produce the thermal printable material, wherein the heat-sensitive material being 3% w/w to 7% w/w of the linerless non-top coated thermal printable material; and
  subjecting the thermal printable material to a supercalendering operation to achieve a smooth surface finish thereon, the supercalendering operation comprising passing the thermal printable material through at least two calender rolls at a temperature ranging from 30° C. to 80° C. rolling at a speed ranging from 150 m/min to 500 m/min at a pressure ranging from 50 bar to 120 bar to obtain the linerless non-top coated thermal printable material.

In another aspect, an embodiment of the present disclosure provides a linerless non-top coated thermal printable material comprising:
  a thermal printable material comprising:
    a base printable material, wherein the base printable material being 75% w/w to 85% w/w of the linerless non-top coated thermal printable material;
    a heat-resistant material applied on the base printable material, wherein the heat-resistant material being 12% w/w to 18% w/w of the linerless non-top coated thermal printable material; and
    a heat-sensitive material applied on the heat-resistant material to produce the thermal printable material, wherein the heat-sensitive material being 3% w/w to 7% w/w of the linerless non-top coated thermal printable material,
  wherein the linerless non-top coated thermal printable material is a supercalendered product with a smooth surface finish thereon obtained by passing the thermal printable material through at least two calender rolls at a temperature ranging from 30° C. to 80° C. rolling at a speed ranging from 150 m/min to 500 m/min at a pressure ranging from 50 bar to 120 bar.

In yet another aspect, an embodiment of the present disclosure provides a thermal label comprising the aforementioned linerless non-top coated thermal printable material obtained using the aforementioned method.

Embodiments of the present disclosure substantially eliminate or at least partially address the aforementioned problems in the prior art, and enable an improved and efficient method for producing the linerless non-top coated thermal printable material. Moreover, the method includes the step of subjecting the thermal printable material to the supercalendering operation under pre-defined conditions to produce a super-finished linerless non-top coated thermal printable material. Advantageously, the linerless non-top coated thermal printable material that is produced using the method is self-sufficient and cost-efficient due to the low requirement of any additional coating of an adhesive or a silicone thereon. Beneficially, the method for producing the linerless non-top coated thermal printable is ecological and sustainable.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for producing a linerless non-top coated thermal printable material, the method comprising:
preparing a thermal printable material by:
receiving a base printable material, wherein the base printable material being 75% w/w to 85% w/w of the linerless non-top coated thermal printable material;
applying a heat-resistant material on the base printable material, wherein the heat-resistant material being 12% w/w to 18% w/w of the linerless non-top coated thermal printable material; and
applying a heat-sensitive material on the heat-resistant material to produce the thermal printable material, wherein the heat-sensitive material being 3% w/w to 7% w/w of the linerless non-top coated thermal printable material; and
subjecting the thermal printable material to a supercalendering operation, the supercalendering operation comprising passing the thermal printable material through at least two calender rolls at a temperature ranging from 30° C. to 80° C. rolling at a speed ranging from 150 m/min to 500 m/min at a pressure ranging from 50 bar to 120 bar to obtain the linerless non-top coated thermal printable material.

In another aspect, an embodiment of the present disclosure provides a linerless non-top coated thermal printable material comprising:
a thermal printable material comprising:
a base printable material, wherein the base printable material being 75% w/w to 85% w/w of the linerless non-top coated thermal printable material;
a heat-resistant material applied on the base printable material, wherein the heat-resistant material being 12% w/w to 18% w/w of the linerless non-top coated thermal printable material; and
a heat-sensitive material coated on the heat-resistant material to produce the thermal printable material, wherein the heat-sensitive material being 3% w/w to 7% w/w of the linerless non-top coated thermal printable material,
wherein the linerless non-top coated thermal printable material is a supercalendered product obtained by passing the thermal printable material through at least two calender rolls at a temperature ranging from 30° C. to 80° C. rolling at a speed ranging from 150 m/min to 500 m/min at a pressure ranging from 50 bar to 120 bar.

In yet another aspect, an embodiment of the present disclosure provides a thermal label comprising the aforementioned linerless non-top coated thermal printable material obtained using the aforementioned method.

The present disclosure provides the aforementioned method for producing the linerless non-top coated thermal printable material, the aforementioned linerless non-top coated thermal printable material, and the aforementioned thermal label. The method employs a combination of actions to produce an improved linerless non-top coated thermal printable material having enhanced properties. Moreover, the method enables a reduction of the number of layers associated with the thermal printable material and the thermal labels as compared to the conventional thermal printable material and the conventional thermal labels. In this regard, the method comprises subjecting the thermal printable material to a supercalendering operation to achieve a smooth surface finish thereon. Advantageously, the supercalendering operation reduces the consumption of silicone, thereby final product cost-efficient. Furthermore, the calendering is performed at pre-defined conditions such as the thermal printable material is passed through at least two calender rolls at a temperature ranging from 30° C. to 80° C. rolling at a speed ranging from 150 m/min to 500 m/min at a pressure ranging from 50 bar to 120 bar to obtain the supercalendered product that is suitable and efficient for thermal printing thereon. Beneficially, when in use, the linerless non-top coated thermal printable material may not generate any waste, thereby making the method environmentally friendly.

Pursuant to the embodiments of the present disclosure, the term "linerless non-top coated thermal printable material" as used herein refers to a material having no release liner or an additional top layer or coating thereon, and is configured to be printed with text or graphics as a medium for communicating information. Optionally, when in use, the linerless non-top coated thermal printable material may be subjected to thermal printing thereon. Beneficially, the non-coated thermal printable material is cost-effective and requires fewer thermal chemicals. Beneficially, the linerless non-top coated thermal printable material is more economical than the conventional thermal printable material due to less material layers, less storage space and cost, less manufacturing costs, and less residual waste associated therewith.

The method comprises preparing a thermal printable material. The term "thermal printable material" as used herein refers to a recording media that is configurable to be printed with heat from a thermal printer. Optionally, the printed image is produced by heat, without using a printing ink, when a selected area of the thermal printable material passes through a thermal print head of the thermal printer.

The thermal printable material is prepared by receiving a base printable material. The term "base printable material" as used herein refers to a first or a primary layer of the thermal printable material. Optionally, the base printable material is composed of a chemical pulp. The term "chemical pulp" as used herein refers to any chemical compound suitable for the fabrication of the base printable material. Optionally, the base printable material is selected from any of: a softwood, a hardwood or a combination thereof. The softwood refers to wood obtained from seed-producing plants, namely gymnosperm trees. In this regard, the softwoods may be used to produce paper pulp, cardboard, and so forth. Optionally, the softwood may be resistant to insect attacks, such as from woodworm. The hardwood refers to wood obtained from angiosperm trees. Optionally, the hardwood may be dense which adds to durability, appearance, and performance thereof. Optionally, the base printable material is a combination of the softwood and the hardwood. It will be appreciated that the chemical pulp may comprise a chemical treatment of the softwood, the hardwood, or a combination thereof. Optionally, the base printable material may be a fiber sheet, a tile, a laminate, or any suitable combination thereof. Additionally, or alternatively, optionally, the base printable material may be selected from any of: a plastic material or a foil material. Optionally, the base printable material may have a latex-based precoating. Optionally, the base printable material may possess a high surface strength. Optionally, the base printable material may be selected based on an application thereof. In this regard, the base printable material being 75% w/w to 85% w/w of the linerless non-top coated thermal printable material. Optionally, the base printable material being 75, 77, 79, 81 or 83 up to 77, 79, 81, 83 or 85% of the linerless non-top coated thermal printable material.

Moreover, the thermal printable material is prepared by applying a heat-resistant material on the base printable material. The term "heat-resistant material" as used herein refers to a material that improves heat insulation, smoothness, uniformity, and anchoring of adjacent layers thereto. Optionally, the heat-resistant material prevents heat transfer through one layer, such as a lower layer of the thermal printable material, to another, such as a top layer, during the thermal printing. Typically, the heat resistant material may be a calcinated clay, a kaolin, a binder, a pigment (such as a hollow sphere pigment), and the like. In this regard, the heat-resistant material is 12% w/w to 18% w/w of the linerless non-top coated thermal printable material. Optionally, the heat-resistant material is 12, 13, 14, 15, 16 or 17 up to 13, 14, 15, 16, 17 or 18% w/w of the linerless non-top coated thermal printable material.

Furthermore, the thermal printable material is prepared by applying a heat-sensitive material on the heat-resistant material to produce the thermal printable material. The term "heat-sensitive material" as used herein refers to chemical compositions including, but not limited to, a colour former (namely dye) a developer, and so forth, that can change the dye into a coloured form when heated. Optionally, the heat sensitive material may be a thermal dye, a thermal developer a sensitizer or a combination thereof. Optionally, the heat-sensitive material may include binders, pigments, sensitizer, minerals, optical brightener, UV absorber, and other additives which impart various properties to the finished thermal printable material. In this regard, the heat-sensitive material is 3% w/w to 7% w/w of the linerless non-top coated thermal printable material. Optionally, the heat-sensitive material is 3.0, 3.5, 4.0, 4.5, 5.0, 5.5 or 6.0 up to 3.5, 4.0, 4.5, 5.5, 6.0, 6.5 or 7% w/w of the linerless non-top coated thermal printable material. Moreover, the heat-sensitive material enables the formation of graphics (comprising text, images, and so on) with a thermal reaction. In an example, the thermal printable material may turn black in the heated areas due to the heat-sensitive material present thereon.

Optionally, the percentage w/w compositions of the base printable material, the heat-resistant material, and the heat-sensitive material may vary slightly depending on a square mass of the thermal printable material. In an exemplary implementation, the percentage w/w compositions of the base printable material, the heat-resistant material, and the heat-sensitive material when the square mass of paper is typically in the range of 50 to 75 g/m² may be 80%, 15%, and 5%, respectively.

Moreover, the method comprises subjecting the thermal printable material to a supercalendering operation. The term "supercalendering" as used herein refers to a process of changing a surface structure and a thickness of paper under the influence of compression pressure, cutting, and friction forces. Moreover, the supercalendering operation may provide properties such as an even coarseness, tight surface, uniform density and thereby reducing a potential silicone consumption by the thermal printable material. In this regard, the supercalendering operation is performed by passing the thermal printable material through at least two calender rolls at a temperature ranging from 30° C. to 80° C. rolling at a speed ranging from 150 m/min to 500 m/min at a pressure ranging from 50 bar to 120 bar to obtain the linerless non-top coated thermal printable material. In this regard, the thermal printable material may be passed through two or more calender rolls based on an application thereof. Optionally, the printable material may be subjected to 1 to 20 nips in the calender rolls. Optionally, the number of nips may be 1, 5, 10 or 15 nips up to 5, 10, 15 or 20 nips, preferably 2, 4, 6, 8 or 10 nips up to 4, 6, 8, 10 or 12 nips, more preferably 10 nips. Optionally, the at least two calender rolls are selected from at least one of: a metal roll, a plastic roll, a fibre roll, a composite material roll, or a combination thereof. In this regard, optionally, a side of the thermal printable material that needs to be smoothened may be placed against the calender rolls comprising a series of alternating hard and/or soft-faced rolls. Moreover, the at least two calender rolls may be fabricated using a metal, an alloy, a plastic or a fibre based on an application thereof. Furthermore, the composite material may be a mixture of materials having different characteristics. Optionally, the temperature may be in a range of 30, 40, 50, 60 or 70° C. up to 40, 50, 60, 70 or 80° C., preferably 40, 45, 50 or 55° C. up to 45, 50, 55 or 65° C. Optionally, the supercalendering operation comprises passing the thermal printable material through the at least two calender rolls at a temperature ranging from 50° C. to 80° C. Optionally, the temperature may be in a range of 50, 60 or 70° C. up to 60, 70 or 80° C. Beneficially, the said temperature range may allow an efficient supercalendering of the thermal printable material. Optionally, at least two calender rolls may roll at a speed ranging from 150, 200, 250, 300, 350, 400 or 450 m/min up to 200, 250, 300, 350, 400, 450 or 500 m/min, preferably 220, 225, 230 or 235 m/min up to 225, 230, 235 or 240 m/min.

Optionally, the pressure may be in a range of 50, 55, 60, 65, 70, 75, 80, 85, 90 or 95 bar up to 55, 60, 65, 70, 75, 80, 85, 90 or even 120 bar, preferably 75, 76, 77, 78 or 79 bar up to 76, 77, 78, 79 or 80 bar. Optionally, the supercalendering operation comprises passing the thermal printable material through the at least two calender rolls at a pressure ranging from 70 bar to 80 bar. Optionally, the pressure may be in a range of 70, 72, 74, 76, 78 or 80 bar up to 72, 74, 76, 78 or 80 bar. Beneficially, the said pressure range enables the supercalendering operation to be performed with an optimum pressure in order to prevent the thermal printable material from damaging. Advantageously, the surface finish may enhance the performance characteristics and printability of the printable material. It will be appreciated that the various calender rolls may be maintained at different temperatures. For example, an upper calender roll may be maintained at a temperature in a range of 30-70° C. and for a lower calender roll may be maintained at a temperature in a range of 10-40° C.

In an example, the linerless non-top coated thermal printable material such as KMLZS-75 having a total square mass of 75 g/m$^2$ comprises 59 g/m$^2$ i.e, 79% of the base printable material, 9 g/m$^2$ i.e, 12% of the heat-resistant material, and 2 g/m$^2$ i.e, 6% of the heat-sensitive material. In another example, the linerless non-top coated thermal printable material such as KMLZS2-70 having a total square mass of 70 g/m$^2$ comprises 58 g/m$^2$ i.e, 83% of the base printable material, 5.5 g/m$^2$ i.e, 8% of the heat-resistant material, and 4.6 g/m$^2$ i.e, 6.6% of the heat-sensitive material.

Alternatively, other calendering operations, such as soft calendaring operation, may be used that provides a finer surface finish to the thermal printable material as compared to the conventional thermal printable material (but lower than the thermal printable material obtained from the supercalendering operation) by pushing it, under a comparatively lighter pressure than the supercalendering operation through a series of soft-faced rolls.

Optionally, a dispersion glue may be used for binding various layers of the thermal printable material. Typically, the dispersion glue is liquid at room temperature and may contain solid particles floating in a fluid. Moreover, the dispersion glue may dry quickly with respect to solutions like starch. Furthermore, the dispersion glue is water-based, solvent-free, cost-effective, and environmentally friendly. Optionally, a hot-melt adhesive may be used for binding various layers of the thermal printable material Additionally, the hot-melt adhesive is a form of thermoplastic adhesive that is designed to be applied using a hot glue gun. In general, hot melt adhesive may be applied by extruding, rolling, or spraying. Optionally, the hot-melt adhesive may be ideal for porous and permeable substrates due to a high melt viscosity thereof. It will be appreciated that the glue is heat-sensitive.

Optionally, the method further comprises
applying an adhesive layer on a bottom surface of the linerless non-top coated thermal printable material; and
coating a release layer at least partly on a top surface of the linerless non-top coated thermal printable material.

In this regard, the adhesive layer enables an effective stickability of the linerless non-top coated thermal printable material on a desired product. Optionally, the adhesive layer may increase the heat stability of the linerless non-top coated thermal printable material. Optionally, the adhesive layer comprises a pressure-sensitive adhesive. The term "pressure-sensitive adhesive" as used herein refers to a nonreactive adhesive that forms a bond with the bottom surface of the linerless non-top coated thermal printable material when pressure is applied thereto. Optionally, the degree of the bond may be influenced by the amount of pressure used to apply the adhesive to the bottom surface of the linerless non-top coated thermal printable material. Beneficially, the pressure-sensitive adhesive may require no solvent, water, or heat to activate the adhesive layer. Advantageously, the pressure-sensitive adhesive may form a bond and hold the linerless non-top coated thermal printable material efficiently at normal room temperature. Optionally, the pressure-sensitive adhesive may not reduce or lose the track thereof at low temperatures, thereby retaining the shear holding ability thereof at high temperatures.

Optionally, the release layer is composed of a silicone. In this regard, the release layer is fabricated from the silicon material. It will be appreciated that the silicone aids in an easy removal of the linerless non-top coated thermal printable material from a surface. Optionally, an amount of silicone in the release layer is in a range of 0.5 to 1.2 gram/meter$^2$. Optionally, the amount of silicone may be in a range of 0.5, 0.75 or 1.0 gram/meter$^2$ up to 0.75, 1.0 or 1.2 gram/meter$^2$. In this regard, the linerless non-top coated thermal printable material may consume a less amount of silicone, thereby making the linerless non-top coated thermal printable material cost-effective. Beneficially, the non-porous characteristic of the base printable material enables the silicone to remain on the surface and cure the linerless non-top coated thermal printable material efficiently. Optionally, the step of coating the release layer may be performed by an end-user or another developer that uses the applicant's linerless non-top coated thermal printable material.

Moreover, the release layer aids in efficient removal of a first part of the liner thermal printable material from a second part of the linerless non-top coated thermal printable material, wherein the first part sits over the second part, for example, in a roll configuration or a stack configuration, thereby preventing the first part and the second part from sticking permanently with each other. It will be appreciated that, in this regard, the first part comprises the adhesive layer that comes in contact with the silicon layer of the second part.

It will be appreciated that during the manufacturing process, the release layer and the adhesive layer may not be applied to the linerless non-top coated thermal printable material. In this regard, the release layer and the adhesive layer may be applied to the linerless non-top coated thermal printable material by an end user, such as another developer, which uses the linerless non-top coated thermal printable material for a desired application.

Optionally, the linerless non-top coated thermal printable material comprises at least one of:
- a basis weight in a range from 40 to 80 gram/meter$^2$;
- a thickness in a range from 40 to 80 micrometer;
- a smoothness in a range from 500 to 2000 seconds;
- a porosity in a range from 1200 to 5000 seconds;
- a surface roughness in a range from 0.2 to 1 micrometer;
- a printing speed in a range from 0.5 to 1.0 millimeter/second;
- a water absorbability in a range from 0.4 to 6.0 gram/meter$^2$;
- an oil absorbability in a range from 0.9 to 6.0 gram/meter$^2$; and
- a brightness in a range from 80 to 130%.

It will be appreciated that the linerless non-top coated thermal printable material possesses the aforementioned properties in order to enable an efficient thermal printing thereon. Optionally, the aforementioned properties of the linerless non-top coated thermal printable material may be measured by using a variety of laboratory tests. Optionally, the laboratory test may employ an Autoline 400 automatic testing system. Beneficially, the Autoline 400 automatic testing system enables measuring square weight, thickness, shine, roughness (PPS), smoothness (BEKK) tensile strength and elongation, tear strength, porosity (Gurley), fibrous intensity (TSO) and colour characteristics from cross-track samples or separate sheets of the linerless non-top coated thermal printable material.

The properties of the linerless non-top coated thermal printable material may be measured by using a variety of laboratory tests, and standards, and below are listed measurements and standards which have been used for measuring;
- A basis weight in a range from 70 to 80 gram/meter$^2$ measured with L&W Autoline 400 or Mettler Toledo Scale, applying SCAN-P&:75 and ISO 536 (Standard).
- A thickness in a range from 70 to 80 micrometer measured with L&W Autoline 400 or L&W Micrometer, ISO 534. A smoothness in a range from 500 to 2000 seconds applying L&W Autoline 400 or Applied BEKK (Büichel-van der Korput), applying ISO 5621/DIN 53107/TAPPI T 479.
- A porosity in a range from 1200 to 5000 seconds measured with L&W Autoline 400 or L&W Densometer Gurley 121D, applying ISO 5636-5.
- A surface roughness in a range from 0.2 to 1 micrometer measured with L&W Autoline 400 or Messmer (Büichel-van der Korput), applyings ISO 8791-4.
- A printing speed in a range from 0.5 to 1.0 millimeter/second measured with MP Nova DT-printter.
- A water absorbability in a range from 0.4 to 6.0 gram/meter2 measured with "Cobb" deviceSCAN P12:64 (ISO 535).
- An oil absorbability in a range from 0.9 to 6.0 gram/meter2; and measured with Cobb Unger-device, applying SCAN P37:77.
- An brightness in a range from 80 to 130% measured with L&W Autoline 400 or L&W Elrepho (ISO-whiteness) (C/2°), ISO 2470:1999), (CIE-whiteness)(D65/10°) ISO 11475/SCAN-P66).
- L&W in the above is the abbreviation for Lorentzen & Wettre apparatuses.

In an example, the linerless non-top coated thermal printable material may be subjected to a Shirlastain test to determine the aforementioned properties. Beneficially, the aforementioned properties aid in determining the effect of porosity and smoothness of the linerless non-top coated thermal printable material on the silicon coverage. Optionally, the basis weight may be in a range from 40, 45, 50, 55, 60, 65, 70, or 75 gram/meter$^2$ up to 45, 50, 55, 60, 65, 70, 75 or, 80 gram/meter$^2$. Optionally, the thickness may be in a range from 40, 45, 50, 55, 60, 65, 70, or 75 micrometer up to 45, 50, 55, 60, 65, 70, 75 or, 80 micrometer. Optionally, the smoothness may be in a range from 500, 600, 700, 800, 900, 1000, 1300, 1500, 1700 or 1900 seconds up to 600, 700, 800, 900, 1000, 1300, 1500, 1700, 1900 or 2000 seconds. Optionally, the porosity may be in a range from 1200, 1600, 2000, 2400, 2800, 3200, 3600, 4000, 4400 or 4800 seconds up to 1600, 2000, 2400, 2800, 3200, 3600, 4000, 4400, 4800 or 5000 seconds. Optionally, the linerless non-top coated thermal printable material may be subjected to a Gurley test for determining the porosity thereof. Optionally, the surface roughness may be in a range from 0.2, 0.3, 0.4, 0.5, 0.6, 0.7, 0.8 or 0.9 micrometer up to 0.3, 0.4, 0.5, 0.6, 0.7, 0.8, 0.9 or 1 micrometer. Optionally, the linerless non-top coated thermal printable material may be subjected to an IGT test for determining the printing speed thereof. Optionally, the printing speed may be in a range from 0.5, 0.6, 0.7, 0.8 or 0.9 millimeter/second up to 0.6, 0.7, 0.8, 0.9 or 1 millimeter/second. Optionally, the linerless non-top coated thermal printable material may be subjected to a Cobb-Unger 120 s test for determining the water absorbability thereof. Optionally, the water absorbability may be in a range from 0.4, 0.7, 0.9, 1.2, 1.5, 2.0, 3.0, 4.0 or 5.0 gram/meter$^2$, up to 0.7, 0.9, 1.2, 1.5, 2.0, 3.0, 4.0, 5.0 or 6.0 gram/meter$^2$. Optionally, the linerless non-top coated thermal printable material may be subjected to a Cobb 60 silicone oil test for determining the oil absorbability thereof. Optionally, the oil absorbability may be in a range from 0.9, 1.2, 1.5, 2.0, 3.0, 4.0 or 5.0 gram/meter$^2$, up to 1.2, 1.5, 2.0, 3.0, 4.0, 5.0 or 6.0. Optionally, the brightness may be in a range from 80, 90, 100, 110 or 120%, up to 90, 100, 110, 120 or 130%. Optionally, the linerless non-top coated thermal printable material additionally comprises at least one of: a pigment, a binder, a colorant. Typically, a thermal dye or a thermal developer may be used in a proportion of 1:2.

Optionally, the method further comprises applying a barrier layer under the linerless non-top coated thermal printable material. Herein, the term "barrier layer" refers to an additional layer that is used to restrict the flow of oil, grease, water, oxygen or moisture through a variety of materials. Advantageously, in an example, the barrier layer acts as a protective layer. In this regard, the barrier layer may be applied as an additional coating to the linerless non-top coated thermal printable material. Optionally, the barrier layer is applied in opposite to the release layer. Optionally, the barrier layer may be composed of the pigment, the Polyvinyl alcohol, the starch, and the like.

The present disclosure also relates to the linerless non-top coated thermal printable material as described above. Various embodiments and variants disclosed above apply mutatis mutandis to the linerless non-top coated thermal printable material.

In this regard, the supercalendered product refers to a product obtained by the supercalendering operation as mentioned above.

Optionally, the base printable material is selected from a softwood, a hardwood or a combination thereof.

Optionally, the at least two calender rolls are selected from at least one of: a metal roll, a plastic roll, a fibre roll, a combination thereof.

Optionally, the linerless non-top coated thermal printable material comprises at least one of:
- a basis weight in a range from 40 to 80 gram/meter$^2$;
- a thickness in a range from 40 to 80 micrometer;
- a smoothness in a range from 500 to 2000 seconds;
- a porosity in a range from 1200 to 5000 seconds;
- a surface roughness in a range from 0.2 to 1 micrometer;
- a printing speed in a range from 0.5 to 1.0 millimeter/second;
- a water absorbability in a range from 0.4 to 6.0 gram/meter$^2$;
- an oil absorbability in a range from 0.9 to 6.0 gram/meter$^2$; and
- a brightness in a range from 80 to 130%.

Optionally, the linerless non-top coated thermal printable material further comprises
- an adhesive layer applied on a bottom surface of the linerless non-top coated thermal printable material; and
- a release layer coated at least partly on a top surface of the linerless non-top coated thermal printable material.

Optionally, the adhesive layer comprises a pressure-sensitive adhesive.

Optionally, the release layer is composed of a silicone.

Optionally, an amount of silicone in the release layer is in a range of 0.5 to 1.2 gram/meter$^2$.

The present disclosure also relates to the thermal label as described above. Various embodiments and variants disclosed above apply mutatis mutandis to the thermal label.

The term "thermal label" as used herein refers to a printable material having a thermochromic coating thereon that turns black in the areas where heated and thereby producing an image thereon. In this regard, the thermal label comprises the linerless non-top coated thermal printable material in order to enable efficient and accurate thermal printing thereon. Advantageously, the thermal label provides improved image stability.

Optionally, the linerless non-top coated thermal printable material further comprises a barrier layer applied under the linerless non-top coated thermal printable material.

Optionally, the thermal label further comprises
- an adhesive layer applied on a bottom surface of the linerless non-top coated thermal printable material; and
- coating a release layer coated at least partly on a top surface of the linerless non-top coated thermal printable material.

It will be appreciated that the thermal label may comprise an additional coating of the adhesive layer and the release layer based on the application thereof.

DETAILED DESCRIPTION OF THE DRAWINGS

Figure 1:
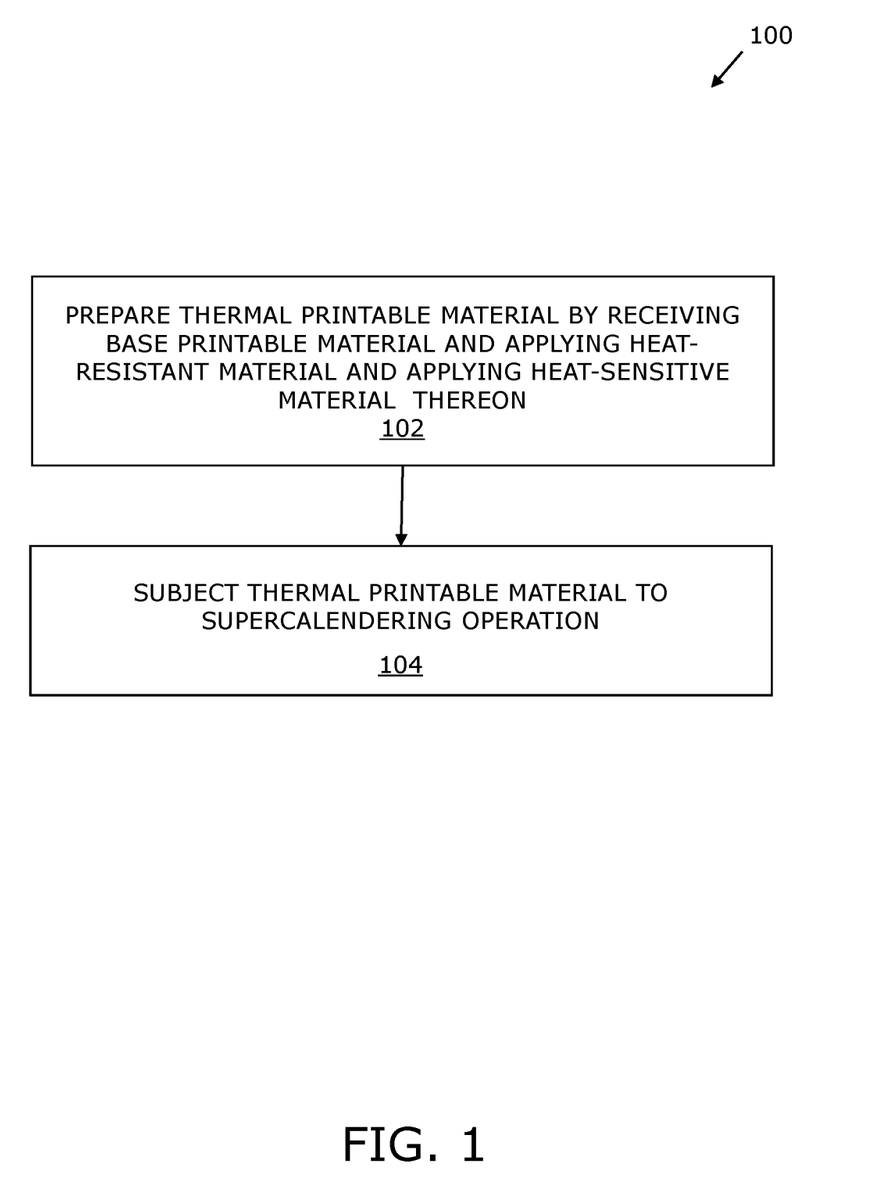
FIG. 1 is a flowchart depicting steps of a method for producing a linerless non-top coated thermal printable material, in accordance with an embodiment of the present disclosure.

Referring to FIG. 1, illustrated is a flowchart 100 depicting steps of a method for producing a linerless non-top coated thermal printable material, in accordance with an embodiment of the present disclosure. At step 102, a thermal printable material is prepared by: receiving a base printable material, wherein the base printable material being 75% w/w to 85% w/w of the linerless non-top coated thermal printable material; applying a heat-resistant material on the base printable material, wherein the heat-resistant material being 12% w/w to 18% w/w of the linerless non-top coated thermal printable material; and applying a heat-sensitive material on the heat-resistant material to produce the thermal printable material, wherein the heat-sensitive material being 3% w/w to 7% w/w of the linerless non-top coated thermal printable material. At step 104, the thermal printable material is subjected to a supercalendering operation, the supercalendering operation comprising passing the thermal printable material through at least two calender rolls at a temperature ranging from 30° C. to 80° C. rolling at a speed ranging from 150 m/min to 500 m/min at a pressure ranging from 50 bar to 120 bar to obtain the linerless non-top coated thermal printable material.

The steps 102 and 104 are only illustrative and other alternatives can also be provided where one or more steps are added, one or more steps are removed, or one or more steps are provided in a different sequence without departing from the scope of the claims herein.

Figure 2:
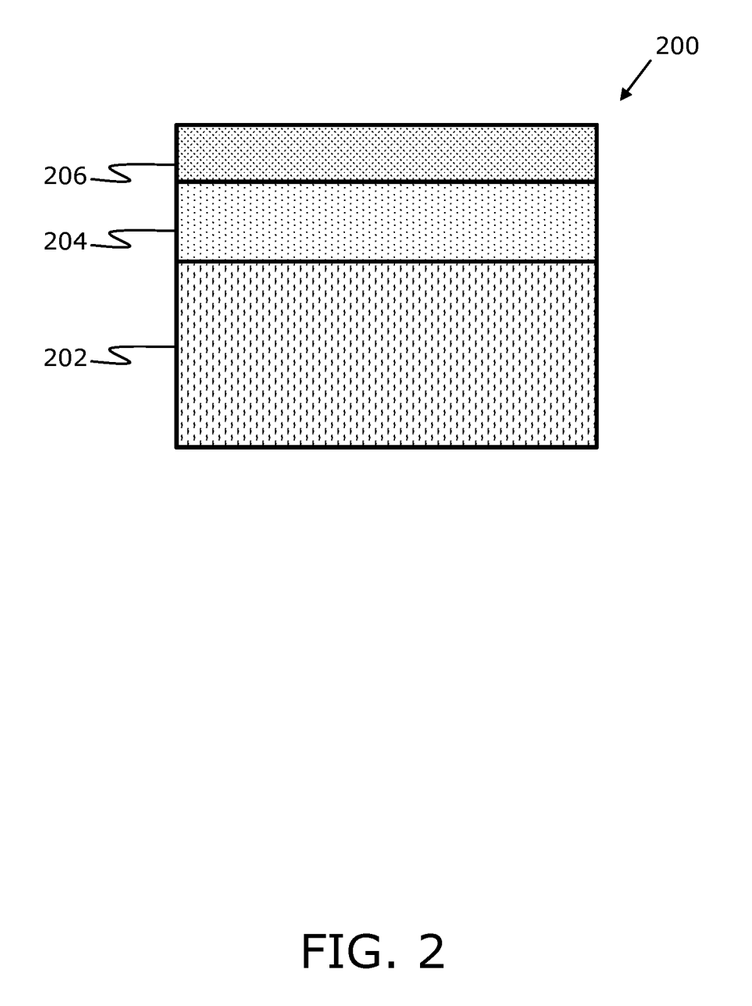
FIG. 2 is a schematic illustration of a thermal printable material, in accordance with an embodiment of the present disclosure.

Referring to FIG. 2, illustrated is a schematic illustration of a thermal printable material 200, in accordance with an embodiment of the present disclosure. As shown, the thermal printable material 200 comprises a base printable material 202. Moreover, the thermal printable material 200 comprises a heat-resistant material 204 applied on the base printable material 202. Furthermore, the thermal printable material 200 comprises a heat-sensitive material 206 coated on the heat-resistant material to produce the thermal printable material.

Figure 3:
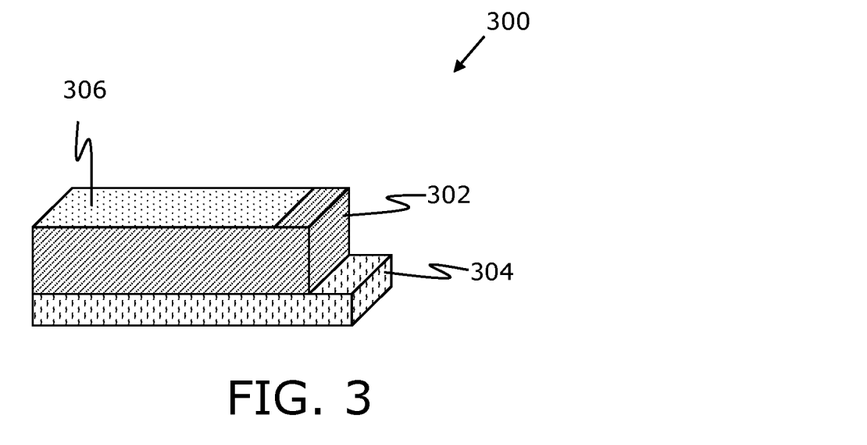
FIG. 3 is a schematic illustration of a linerless non-top coated thermal printable material, in accordance with an embodiment of the present disclosure.

Referring to FIG. 3, illustrated is a schematic illustration of a linerless non-top coated thermal printable material 300, in accordance with an embodiment of the present disclosure. As shown, the linerless non-top coated thermal printable material 300 comprises a thermal printable material 302 (such as the thermal printable material 200 of FIG. 2). Moreover, the linerless non-top coated thermal printable material 300 is a supercalendered product obtained by passing the thermal printable material 302 through at least two calender rolls at a temperature ranging from 30° C. to 80° C. rolling at a speed ranging from 150 m/min to 500 m/min at a pressure ranging from 50 bar to 120 bar. Furthermore, the linerless non-top coated thermal printable material 300 further comprises an adhesive layer 304 applied on a bottom surface of the linerless non-top coated thermal printable material 300; and a release layer 306 coated at least partly on a top surface of the linerless non-top coated thermal printable material 300.

Figure 4:
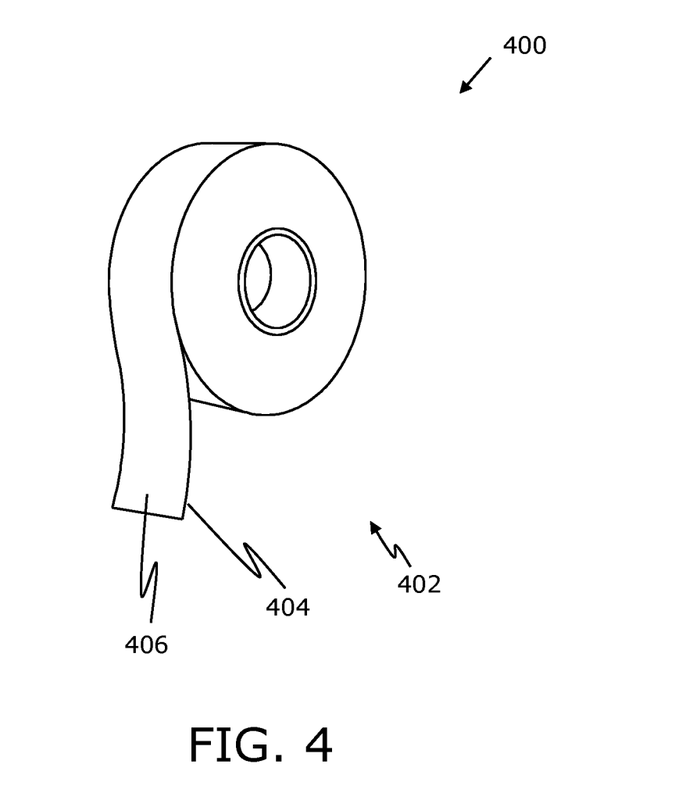
FIG. 4 is a schematic illustration of a thermal label, in accordance with an embodiment of the present disclosure.

Referring to FIG. 4, illustrated is a schematic illustration of a thermal label 400, in accordance with an embodiment of the present disclosure. As shown, the thermal label 400 comprises a linerless non-top coated thermal printable material 402. Moreover, the thermal label 400 comprises an adhesive layer 404 applied on a bottom surface of the linerless non-top coated thermal printable material 402 and a release layer 406 coated at least partly on a top surface of the linerless non-top coated thermal printable material 402.

Figure 5:
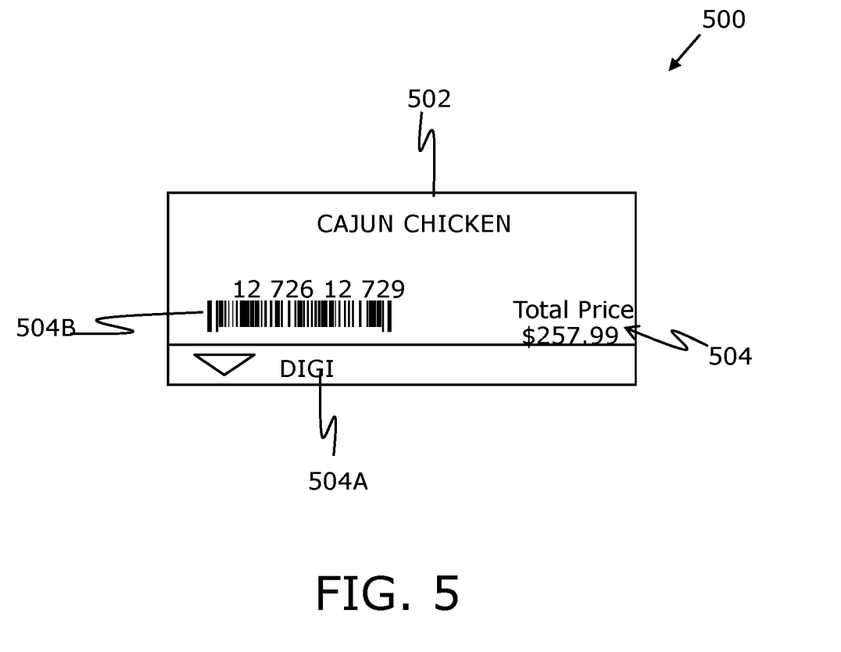
FIG. 5 is an exemplary implementation of a thermal label, in accordance with an embodiment of the present disclosure.

Referring to FIG. 5, illustrated is an exemplary implementation 500 of a thermal label 502, in accordance with an embodiment of the present disclosure. As shown, a zoomed view of the thermal label 502 shows a thermal print 504 thereon, wherein the thermal print 504 includes a text 504A and a unique identification code 504B printed thereon.

Figure 6:
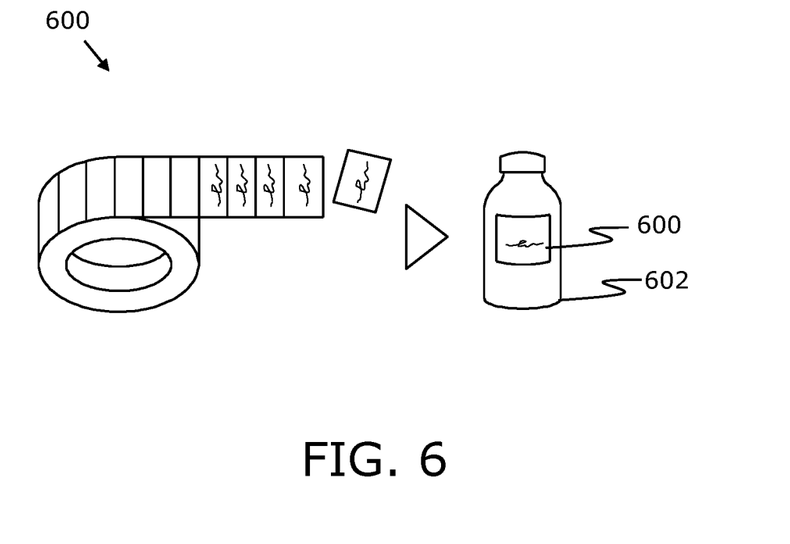
FIG. 6 is an exemplary implementation of a thermal label applied on an object, in accordance with an embodiment of the present disclosure.

Referring to FIG. 6, shown is an exemplary implementation of a thermal label 600 applied on an object 602, in accordance with an embodiment of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for producing a linerless non-top coated thermal printable material, the method comprising:
    preparing a thermal printable material by:
        receiving a base printable material, wherein the base printable material being 75% w/w to 85% w/w of the linerless non-top coated thermal printable material;
        applying a heat-resistant material on the base printable material, wherein the heat-resistant material being 12% w/w to 18% w/w of the linerless non-top coated thermal printable material; and
        applying a heat-sensitive material on the heat-resistant material to produce the thermal printable material, wherein the heat-sensitive material being 3% w/w to 7% w/w of the linerless non-top coated thermal printable material; and
    subjecting the thermal printable material to a supercalendering operation to achieve a smooth surface finish thereon, the supercalendering operation comprising passing the thermal printable material through at least two calender rolls at a temperature ranging from 30° C. to 80° C. rolling at a speed ranging from 150 m/min to 500 m/min at a pressure ranging from 50 bar to 120 bar, to obtain the linerless non-top coated thermal printable material.

2. The method according to claim 1, wherein the supercalendering operation comprises passing the thermal printable material through the at least two calender rolls at a temperature ranging from 50° C. to 80° C.

3. The method according to claim 1, wherein the supercalendering operation comprises passing the thermal printable material through the at least two calender rolls at a pressure ranging from 70 bar to 80 bar.

4. The method according to claim 1, further comprising applying a barrier layer under the linerless non-top coated thermal printable material.

5. The method according to claim 1, wherein the linerless non-top coated thermal printable material comprises at least one of:
    a basis weight in a range from 40 to 80 gram/meter$^2$;
    a thickness in a range from 40 to 80 micrometer;
    a smoothness in a range from 500 to 2000 seconds;
    a porosity in a range from 1200 to 5000 seconds;
    a surface roughness in a range from 0.2 to 1 micrometer;
    a water absorbability in a range from 0.4 to 6.0 gram/meter$^2$;
    an oil absorbability in a range from 0.9 to 6.0 gram/meter$^2$; and
    a brightness in a range from 80 to 130%.

6. The method according to claim 1, further comprising:
    applying an adhesive layer on a bottom surface of the linerless non-top coated thermal printable material; and
    coating a release layer at least partly on a top surface of the linerless non-top coated thermal printable material.

7. The method according to claim 6, wherein the adhesive layer comprises a pressure-sensitive adhesive.

* * * * *